US010839779B2

(12) United States Patent
Kubita

(10) Patent No.: US 10,839,779 B2
(45) Date of Patent: Nov. 17, 2020

(54) PERFORMANCE ASSISTANCE APPARATUS AND METHOD

(71) Applicant: YAMAHA CORPORATION, Hamamatsu (JP)

(72) Inventor: Akemi Kubita, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/522,805

(22) Filed: Jul. 26, 2019

(65) Prior Publication Data

US 2019/0348015 A1 Nov. 14, 2019

Related U.S. Application Data

(63) Continuation of application No. PCT/JP2018/008101, filed on Mar. 2, 2018.

(30) Foreign Application Priority Data

Mar. 3, 2017 (JP) ................. 2017-040598

(51) Int. Cl.
*G10H 1/00* (2006.01)
*G09B 15/00* (2006.01)
(Continued)

(52) U.S. Cl.
CPC ......... *G10H 1/0016* (2013.01); *G09B 15/003* (2013.01); *G09B 15/023* (2013.01);
(Continued)

(58) Field of Classification Search
CPC ... G10H 1/0016; G09B 15/003; G09B 15/023
See application file for complete search history.

(56) References Cited

U.S. PATENT DOCUMENTS 4,331,062 A * 5/1982 Rogers ................. G09B 15/023
84/470 R
5,690,496 A 11/1997 Kennedy
(Continued)

FOREIGN PATENT DOCUMENTS

JP S54113524 U 8/1979
JP H0627938 A 2/1994
(Continued)

OTHER PUBLICATIONS

International Search Report issued in Intl. Appln. No. PCT/JP2018/008100 dated May 22, 2018. English translation provided.
(Continued)

*Primary Examiner* — Robert W Horn
(74) *Attorney, Agent, or Firm* — Rossi, Kimms & McDowell LLP

(57) ABSTRACT

To assist a human player in performing a plurality of foot operators (pedal keys) operable with a human player's foot, a foot operator image indicative of the foot operators is displayed on a display screen. Model performance data including at least information indicative of a rhythm and a pitch of a foot performance part to be performed by use of the foot operators is acquired, and a particular foot operator corresponding to the pitch of the foot performance part included in the acquired model performance data is visually designated. At the same time, based on rhythm information for the foot performance part, a rhythm of a sound corresponding to the particular foot operator is presented. The presentation of the rhythm is performed by presenting a sound generation timing and a time length of the sound, and a suitable marker indicative of a performance progression may be additionally displayed.

18 Claims, 9 Drawing Sheets

(51) Int. Cl.
*G09B 15/02* (2006.01)
*G09B 15/08* (2006.01)
*G10H 1/34* (2006.01)
*G10H 1/36* (2006.01)
*G10H 1/42* (2006.01)

(52) U.S. Cl.
CPC ........... *G09B 15/08* (2013.01); *G10H 1/0075* (2013.01); *G10H 1/348* (2013.01); *G10H 1/368* (2013.01); *G10H 1/42* (2013.01); *G10H 2220/015* (2013.01); *G10H 2220/066* (2013.01)

(56) References Cited

U.S. PATENT DOCUMENTS

| | | | |
|---|---|---|---|
| 5,739,457 A | 4/1998 | Devecka | |
| 6,084,167 A * | 7/2000 | Akimoto | G10H 1/32 84/477 R |
| 6,388,181 B2 * | 5/2002 | Moe | G09B 15/08 84/470 R |
| 6,586,666 B2 | 7/2003 | Abe | |
| 7,030,309 B2 * | 4/2006 | Kubita | G10H 1/0075 84/622 |
| 7,220,907 B2 | 5/2007 | McIntosh | |
| 7,361,829 B2 * | 4/2008 | Uehara | G10G 1/02 84/477 R |
| 7,642,440 B2 | 1/2010 | Bailey | |
| 7,767,898 B2 * | 8/2010 | Nakayama | G10H 1/40 84/612 |
| 7,893,337 B2 * | 2/2011 | Lenz | G09B 15/02 84/477 R |
| 8,017,854 B2 | 9/2011 | Foster | |
| 8,158,873 B2 | 4/2012 | Ivanich | |
| 8,303,409 B2 | 11/2012 | Tsubakisawa | |
| 8,338,684 B2 * | 12/2012 | Pillhofer | G09B 15/00 84/470 R |
| 8,350,142 B2 * | 1/2013 | Fujiwara | G10F 1/02 84/615 |
| 8,766,077 B2 * | 7/2014 | Soejima | G09B 5/00 84/470 R |
| 8,785,757 B2 * | 7/2014 | Pillhofer | G09B 15/00 84/470 R |
| 8,895,829 B2 * | 11/2014 | Soejima | G10H 1/00 84/467 |
| 8,987,573 B1 | 3/2015 | Lippens | |
| 9,808,724 B2 | 11/2017 | Bala | |
| 9,836,992 B2 * | 12/2017 | McCarthy | G09B 15/003 |
| 10,102,767 B2 | 10/2018 | Bayadzhan | |
| 10,446,048 B2 * | 10/2019 | Wang | G06F 3/0304 |
| 10,509,529 B2 | 12/2019 | Decker | |
| 2012/0055319 A1 | 3/2012 | Lin | |
| 2014/0260898 A1 | 9/2014 | Bales et al. | |
| 2019/0304424 A1 * | 10/2019 | Katsuta | G09B 15/003 |
| 2019/0348013 A1 * | 11/2019 | Kubita | G10G 1/02 |
| 2019/0348014 A1 * | 11/2019 | Kubita | G10H 1/0016 |
| 2019/0348015 A1 * | 11/2019 | Kubita | G09B 15/003 |

FOREIGN PATENT DOCUMENTS

| | | |
|---|---|---|
| JP | H10247059 A | 9/1998 |
| JP | 2000126460 A | 5/2000 |
| JP | 3239615 B2 | 12/2001 |
| JP | 2005084069 A | 3/2005 |
| JP | 2005265903 A | 9/2005 |
| JP | 2014077965 A | 5/2014 |

OTHER PUBLICATIONS

Written Opinion issued in Intl. Appln. No. PCT/JP2018/008100 dated May 22, 2018.
International Search Report issued in Intl. Appln. No. PCT/JP2018/008101 dated May 22, 2018, English translation provided.
Written Opinion issued in Intl. Appln. No. PCT/JP2018/008101 dated May 22, 2018.
International Search Report issued in Intl. Appln. No. PCT/JP2018/008102 dated May 1, 2018. English translation provided.
Written Opinion issued in Intl. Appln. No. PCT/JP2018/008102 dated May 1, 2018.
Copending U.S. Appl. No. 16/522,813, filed Jul. 26, 2019.
Copending U.S. Appl. No. 16/522,796, filed Jul. 26, 2019.
English translation of Written Opinion issued in Intl. Appln. No. PCT/JP2018/008100 dated May 22, 2018, previously cited in IDS filed Jul. 26, 2019.
International Preliminary Report on Patentability issued in Intl. Appln. No. PCT/JP2018/008100 dated Sep. 12, 2019. English translation provided.
English translation of Written Opinion issued in Intl. Appln. No. PCT/JP2018/008101 dated May 22, 2018, previously cited in IDS filed Jul. 26, 2019.
International Preliminary Report on Patentability issued in Intl. Appln. No. PCT/JP2018/008101 dated Sep. 12, 2019. English translation provided.
English translation of Written Opinion issued in Intl. Appln. No. PCT/JP2018/008102 dated May 1, 2018, previously cited in IDS filed Jul. 26, 2019.
International Preliminary Report on Patentability issued in Intl. Appln. No. PCT/JP2018/008102 dated Sep. 12, 2019. English translation provided.
Office Action issued in Japanese Appln. No. 2017-040599 dated Oct. 23, 2019. English machine translation provided.
Office Action issued in U.S. Appl. No. 16/522,796 dated Apr. 8, 2020.
Office Action issued in Japanese Appln. No. 2017-040599 dated Apr. 21, 2020. English translation provided.
Office Action issued in U.S. Appl. No. 16/522,813 dated Jun. 15, 2020.
Notice of Allowance issued in U.S. Appl. No. 16/522,796 dated Jul. 29, 2020.

* cited by examiner

PERFORMANCE ASSISTANCE APPARATUS AND METHOD

CROSS REFERENCE TO RELATED APPLICATIONS

This application is a continuation of PCT International Application No. PCT/JP2018/008101, filed Mar. 2, 2018, which claims priority under 35 U.S.C. § 119 from Japanese Patent Application No. JP PA 2017-040598, filed Mar. 3, 2017, the entire disclosure of which are herein incorporated by reference.

BACKGROUND

The embodiments of the present invention relate to a performance assistance apparatus and method suited for training of a music performance.

There have heretofore been known electronic musical instruments that have a guide function for guiding a user or human player in a music performance. Such electronic musical instruments have a key depression guide function. The electronic keyboard musical instrument includes LEDs (Light Emitting Diodes) provided in corresponding relation to individual keys of a keyboard. In a guide mode, the LED corresponding to a particular key to be operated is illuminated in a first style a predetermined time before a key-on timing of the key and illuminated in a second style at the key-on timing.

SUMMARY

Some of the existing electronic musical instruments include, in addition to a manual keyboard operable with hands, a pedal keyboard operable with feet, as typified by electronic organs. The pedal keyboard includes a plurality of pedal keys having different pitches (sound pitches) assigned respectively thereto. In order to enable a user to improve his or her skill for performing the pedal keyboard, it is required to provide the user with a performance guide for the pedal keyboard in addition to a performance guide for the manual keyboard. However, the pedal keyboard is located more remote from the eyes of the user than the manual keyboard. Thus, even in a case where the performance guide for the pedal keyboard is provided using LEDs in a similar manner to the performance guide for the manual keyboard, it may be difficult for the user to appropriately know or identify pedal keys to be operated. If the LEDs for the pedal keyboard are provided at positions near the user's eyes, for example, the LEDs and the pedal keyboard are spaced from each other by a relatively great distance, it may be difficult for the user to associate illuminated LEDs and pedal keys to be operated. If the LEDs for the pedal keyboard are provided at positions near the pedal keyboard, on the other hand, it may be difficult for the user to look at the LEDs. For the foregoing reasons, it tends to be difficult to enable the user to improve his or her skill for performing the pedal keyboard.

In view of the foregoing prior art problems, it is one of the objects of the present invention to provide a performance assistance apparatus and method which can assist a human player in performing a foot operator group by use of a structure that is easy for the human player to look at and operate and thereby effectively enables the human player to improve his or her skill for performing the foot operator group.

In order to accomplish the aforementioned and other objects, the inventive performance assistance apparatus is suited for application to a performance apparatus provided with a foot operator group including a plurality of foot operators that are operable with a foot of a human player and that have different sound pitches assigned respectively thereto, and the inventive performance assistance apparatus includes: a storage medium storing a program; and a processor for executing the program, the processor, when executing the program, configured to: cause a display device to display a foot operator image indicative of the foot operator group; acquire model performance data including at least information indicative of a rhythm and a pitch of a foot performance part to be performed by use of the plurality of foot operators; on the basis of the information indicative of the pitch of the foot performance part included in the acquired model performance data, visually designate, on the foot operator image displayed on the display device, a particular foot operator of the plurality of foot operators that corresponds to the pitch; and on the basis of the information indicative of the rhythm of the foot performance part included in the acquired model performance data, present a rhythm of a sound corresponding to the visually-designated particular foot operator.

According to the inventive performance assistance apparatus constructed in the aforementioned manner, the foot operator image indicative of the foot operator group is displayed on the display device, and, on the basis of the information indicative of the pitch and the rhythm of the foot performance part, the particular foot operator to be performed is visually designated (indicated) on the foot operator image and the rhythm of the sound corresponding to the particular foot operator is presented. In this way, the display device can be disposed at a position easy for the human player to look at, without being constrained by a physical position of the foot operator group (such as a pedal keyboard). Thus, the inventive performance assistance apparatus can assist the human player in performing the foot operator group, with a structure easy for the human player to look at. Further, because the human player can easily grasp, based on the presented rhythm of the sound, a timing when he/she should perform the operator, the inventive performance assistance apparatus can assist the human player in performing the foot operator group, with a structure easy for the human player to look at and operate. Namely, the human player can not only intuitively know or identify the position of each of the foot operators to be operated, by looking at the foot operator image, but also easily know, from the presented rhythm, a rhythm and timing when he/she should perform the foot operator. In this way, the human player can easily learn how to suitably operate the foot operator group. Thus, the inventive performance assistance apparatus effectively enables the human player to improve his or her skill for performing the foot operator group.

The disclosure made herein also embraces a method that includes steps corresponding to the constituent elements of the inventive performance assistance apparatus set forth above. The method may be arranged as a computer-implemented method. Also disclosed herein is a computer-readable, non-transitory storage medium storing a program executable by one or more processors for performing the aforementioned method.

BRIEF DESCRIPTION OF DRAWINGS

Certain embodiments of the present invention will hereinafter be described in detail, by way of example only, with reference to the accompanying drawings, in which.

DETAILED DESCRIPTION

Construction of Electronic Musical Instrument

Figure 1:
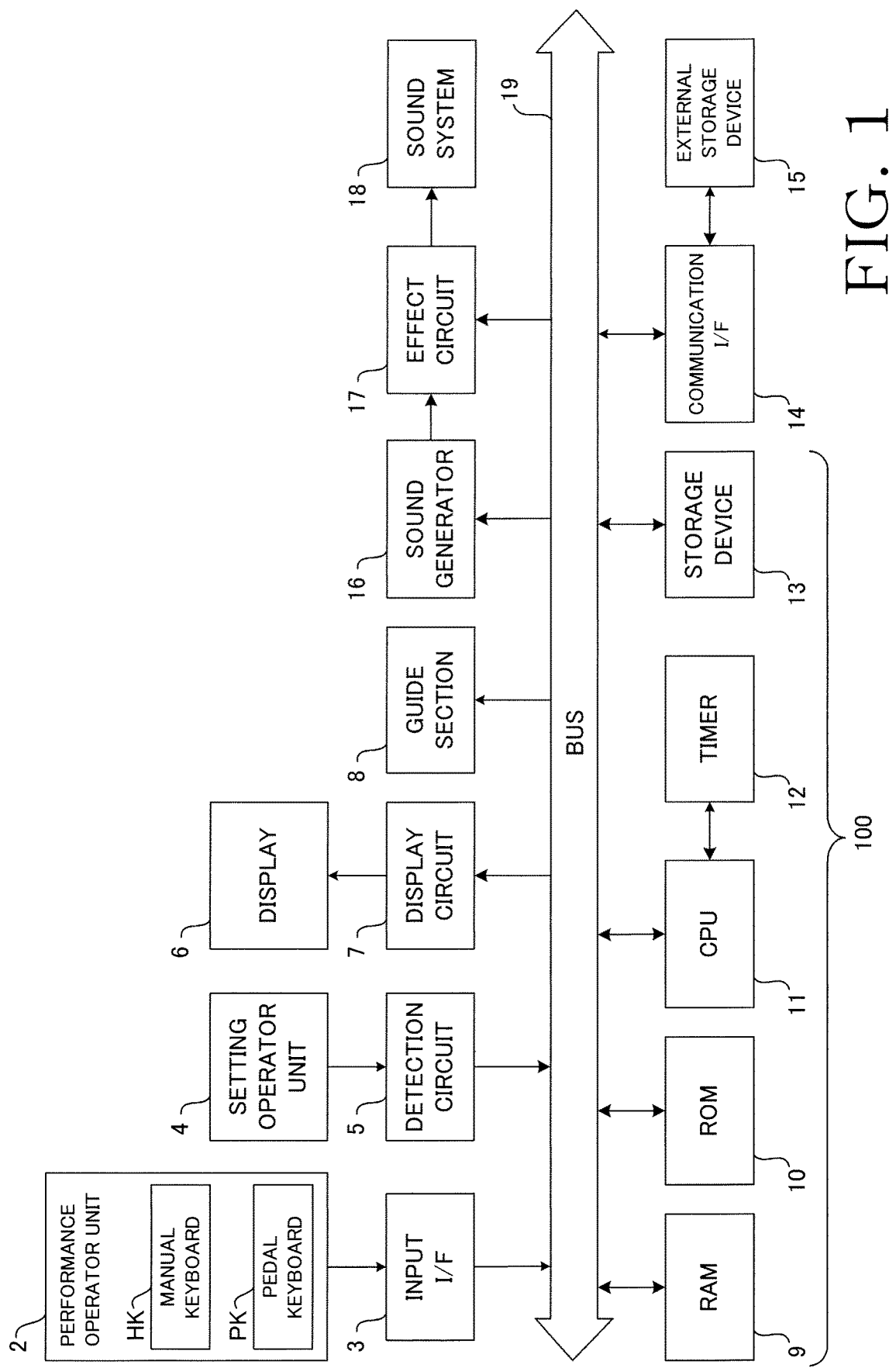
FIG. 1 is a block diagram illustrating an example of a hardware construction of an electronic musical instrument provided with an embodiment of the inventive performance assistance apparatus.

FIG. 1 is a block diagram illustrating an example of a hardware construction of an electronic musical instrument 1 provided with an embodiment of the inventive performance assistance apparatus 100. The electronic musical instrument 1 of FIG. 1 is an electronic keyboard musical instrument capable of performing music pieces. As an operation mode of the electronic musical instrument 1, a training mode is available for executing music performance training by use of a function of the performance assistance apparatus 100 incorporated in the electronic musical instrument 1.

The electronic musical instrument 1 includes a performance operator unit 2, an input I/F (interface) 3, a setting operator unit 4, a detection circuit 5, a display 6, a display circuit 7, and a guide section 8. The performance operator unit 2 is connected to a bus 19 via the input I/F 3. Performance data are input to the electronic musical instrument 1 by a user operating the performance operator unit 2. The performance data are, for example, in the form of MIDI (Musical Instrument Digital Interface) data or audio data. In the illustrated example, the performance operator unit 2 includes a manual keyboard HK (manual operator group) suited for operation with user's (human player's) hands and a pedal keyboard PK (foot operator group) suited for operation with a foot or feet of the user. Details of the manual keyboard HK and pedal keyboard PK will be set forth later. In addition to the manual keyboard HK and pedal keyboard PK, a modulation wheel, a pitch bend wheel pitch bend wheel, and the like may be provided as the performance operator unit 2.

The setting operator unit 4 includes an ON/OFF operation switch, a rotationally operable rotary encoder or a slidingly operable linear encoder, and the like, and this setting operator unit 4 is connected to the bus 19 via the detection circuit 5. The setting operator unit 4 is used to execute sound volume adjustment, turning-ON/OFF of a power supply, and various other settings. The display 6 is a display device generally known as a peripheral device of a computer or the like and includes a flat screen having a necessary and sufficient area. The display 6 includes, for example, a liquid crystal display and is connected to the bus 19 via the display circuit 7. Various information related to a performance, settings, and the like is displayed on the display 6. At least portions of the setting operator unit 4 and display 6 may be constituted by a touch panel display. As generally known, the display 6 is disposed at a position (for example, at an eye level position) that is easy for the user (human player) to look at. Namely, the position of the display 6 is not constrained by a physical position of the pedal keyboard PK. The guide section 8 guides the user or human player in a performance executed using the performance operator unit 2. Details of the guide section 8 will be set forth later.

The electronic musical instrument 1 further includes a RAM (Random Access Memory) 9, a ROM (Read-Only Memory) 10, a CPU (Central Processing Unit) 11, a timer 12, and a storage device 13. The RAM 9, ROM 10, CPU 11, and storage device 13 are connected to the bus 19, and the timer 12 is connected to the CPU 11. External equipment, such as an external storage device 15, may be connected to the bus 19 via a communication I/F (interface) 14. The RAM 9, ROM 10, CPU 11, and timer 12 together constitute a computer.

The RAM 9, which is for example a volatile memory, is used as a working area for the CPU 11 but also temporarily stores various data. The ROM 10, which is for example a non-volatile memory, has stored therein computer programs (application programs), such as control programs and the performance assistance program. The CPU 11 performs later-described performance training processing by executing on the RAM 9 the performance assistance program stored in the ROM 10. The timer 12 gives time information, such as a current time, to the CPU 11.

The storage device 13 includes any of storage media, such as a hard disk, an optical disk, a magnetic disk, and a memory card, to store music piece data sets of a plurality of practice music pieces. Each of the sets of practice music piece data (music piece data sets) includes a plurality of part data corresponding to a plurality of performance parts. Each of the part data, which is for example in the form of MIDI data, includes a plurality of event data indicative of a train of pitches, note-on and note-off time points, velocities, and the like of the corresponding performance part.

The aforementioned performance assistance program may be stored in the storage device 13. Similarly to the storage device 13, the external storage device 15 includes any of storage media, such as a hard disk, an optical disk, a magnetic disk, and a memory card. The aforementioned performance assistance program may be stored in the external storage device 15.

The performance assistance program may be stored in a computer-readable storage medium and supplied in the storage medium to be installed into the ROM 10 or storage device 13. Further, in a case where the communication I/F 14 is connected to a communication network, the performance assistance program delivered from a server connected to the communication network may be installed into the ROM 10 or storage device 13. Similarly, at least one of the music piece data sets may be acquired from a storage medium or acquired from a server connected to the communication network.

The electronic musical instrument 1 further includes a sound generator 16, an effect circuit 17, and a sound system 18. The sound generator 16 and effect circuit 17 are connected to the bus 19, and the sound system 18 is connected to the effect circuit 17. The sound generator 16 generates tone signals on the basis of performance data input via the performance operator unit 2 and part data of a later-described automatic performance part. The effect circuit 17 imparts acoustic effects to the tone signals generated by the sound generator 16.

The sound system 18 includes a digital-to-analog (D/A) conversion circuit, an amplifier, and a speaker. The sound system 18 converts into an analog sound signal a tone signal supplied from the sound generator 16 via the effect circuit 17 and generates a sound based on the analog sound signal. The electronic musical instrument 1 as a whole functions as a performance apparatus that generates a tone in response to a user's performance operation on the performance operator unit 2. Further, in the electronic musical instrument 1, the display 6, RAM 9, ROM 10, CPU 11, and storage device 13 mainly function as the performance assistance apparatus 100.

Performance Operator Unit and Guide Section

Figure 2:
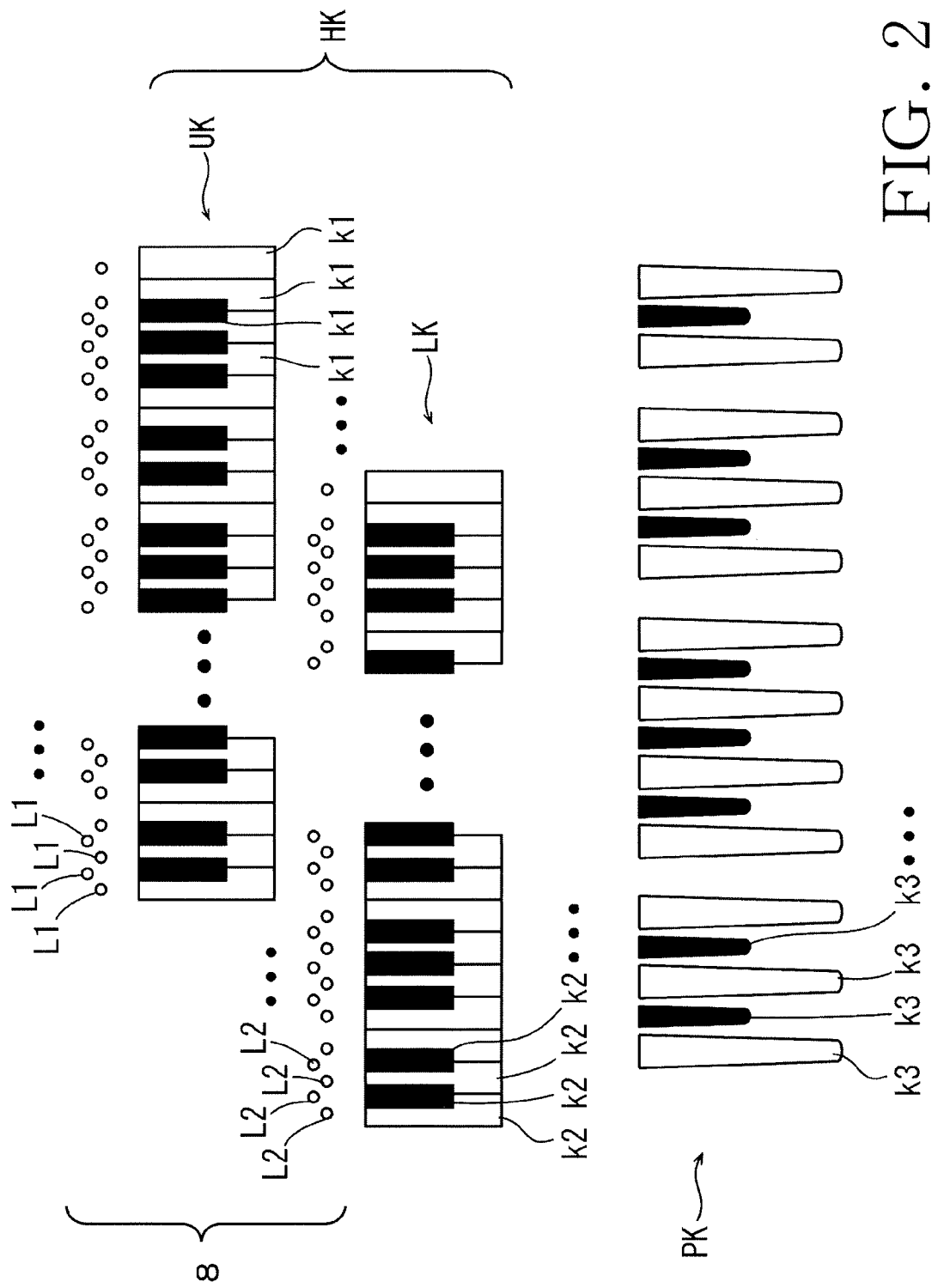
FIG. 2 is a schematic diagram explanatory of a specific example of each of a manual keyboard and a pedal keyboard that constitute a performance operator unit, and a guide section.

FIG. 2 is a schematic diagram explanatory of a specific example of each of the manual keyboard HK and pedal keyboard PK constituting the performance operator unit 2 and the guide section 8. As illustrated in FIG. 2, the manual keyboard HK includes an upper keyboard UK and a lower keyboard LK. The upper keyboard UK and lower keyboard LK are positionally displaced from each other in an up-down direction and in a front-rear direction. More specifically, the upper keyboard UK is located above the lower keyboard LK and rearward of the lower keyboard LK (namely, located more remote from the user than the lower keyboard LK). The upper keyboard UK is suited mainly for operation with the user's right hand, while the lower keyboard LK is suited mainly for operation with the user's left hand. The upper keyboard UK includes a plurality of upper keys k1 having different pitches assigned respectively thereto, and the lower keyboard LK includes a plurality of lower keys k2 having different pitches assigned respectively thereto. The pedal keyboard PK includes a plurality of pedal keys k3 having different pitches assigned respectively thereto. Hereinafter, the upper keys k1 and lower keys k2 will be referred to collectively as manual keys.

The upper keyboard UK includes, for example, forty-nine upper keys k1 (namely, four octaves and one note) or sixty-one upper keys k1 (namely, five octaves and one note). Similarly to the upper keyboard UK, the lower keyboard LK includes forty-nine or sixty-one lower keys k2. The pedal keyboard PK includes, for example, twenty pedal keys k3 (namely, one octave and eight notes) or twenty-five pedal keys k3 (namely, two octaves and one note). Generally, the lowest pitch in the pitch range of the lower keyboard LK is higher than the lowest pitch in the pitch range of the pedal keyboard PK, and the lowest pitch in the pitch range of the upper keyboard UK is higher than the lowest pitch in the pitch range of the lower keyboard LK. Further, the pitch range of the pedal keyboard PK is narrower than the pitch range of each of the upper keyboard UK and lower keyboard LK. The respective pitch ranges of the upper keyboard UK, lower keyboard LK, and pedal keyboard PK may be set in advance or may be set as desired by the user.

Further, in the example illustrated in FIG. 2, the guide section 8 includes a plurality of upper illumination portions L1 corresponding to the individual upper keys k1 and a plurality of lower illumination portions L2 corresponding to the individual lower keys k2. Each of the upper illumination portions L1 and lower illumination portions L2 is constituted, for example, by an LED (Light Emitting Diode). For example, the individual upper illumination portions L1 are provided on a rear panel surface portion of the upper keyboard UK in such a manner that the illumination portions L1 adjoin the corresponding upper keys k1 in the front-rear direction. The individual lower illumination portions L2 are provided on a panel surface portion located between the upper keyboard UK and the lower keyboard LK in such a manner that the illumination portions L2 adjoin the corresponding lower keys k2 in the front-rear direction. In the training mode, any one of the upper illumination portions L1 is illuminated at a time point when the corresponding upper key k1 should be operated, and any one of the lower illumination portions L2 is illuminated at a time point when the corresponding lower key k2 should be operated. In this way, the user can easily know or identify the operating time point of each of the upper keys k1 and lower keys k2. Note that the guide section 8 may include only one of the groups of the upper illumination portions L1 and lower illumination portions L2. In such a case, the guide section 8 guides the user in a performance on only one of the upper keyboard UK and the lower keyboard LK.

Training Screen

In the present example, one of the plurality of practice music pieces prepared in advance is selected by the user in the training mode. Further, any of the plurality of performance parts of the selected music piece that is to be performed by the user is selected as practice performance parts. The practice performance part includes at least one of a performance part to be performed on the upper keyboard UK (hereinafter referred to as "upper performance part"), a performance part to be performed on the lower keyboard LK (hereinafter referred to as "lower performance part"), and a performance part to be performed on the pedal keyboard PK (hereinafter referred to as "pedal performance part"). Note that at least one of the upper performance part, lower performance part, and pedal performance part may be set in advance as the practice performance part.

Figure 3:
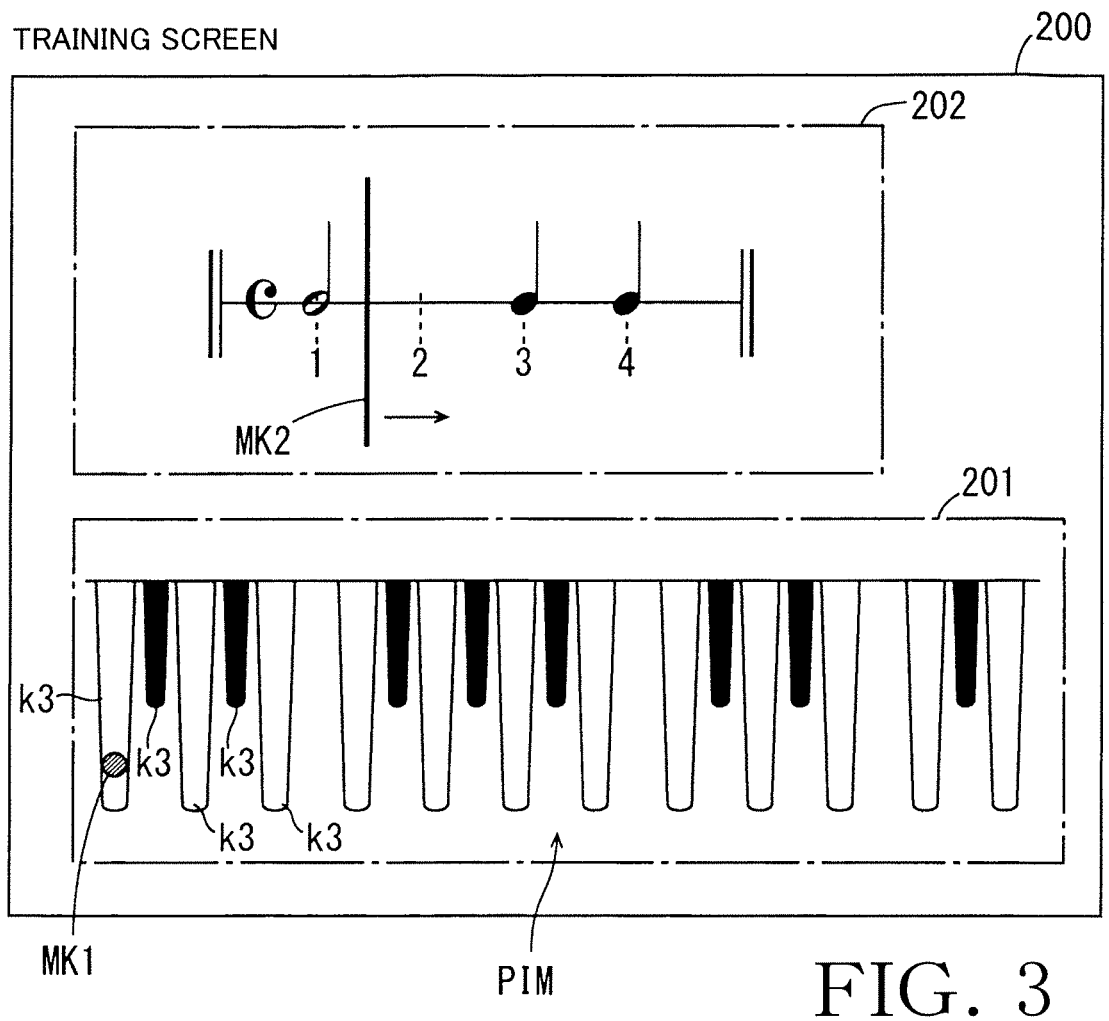
FIG. 3 is a diagram illustrating an example of a training screen displayed on a display.

In accordance with a progression of the selected music piece (namely, a progression of an automatic performance sequence), a guide is provided for assisting the user in performing each of the practice performance parts. A training screen for guiding the user in a performance on the pedal keyboard PK is displayed on the display 6 of FIG. 1. FIG. 3 is a diagram illustrating an example of the training screen 200 displayed on the display 6. In FIG. 3, the training screen 200 includes a pedal keyboard image display region 201 and a rhythm information display region 202. A pedal keyboard image PIM corresponding to the pedal keyboard PK of FIG. 2 is displayed on the pedal keyboard image display region 201. The pedal keyboard image PIM of FIG. 3 corresponds to the pedal keyboard PK having twenty keys.

In accordance with the progression of the music piece (namely, the progression of the automatic performance sequence), the pedal keys k3 to be operated are sequentially designated on the pedal keyboard image PIM. In the present example, a circular marker MK1 is additionally displayed on the image of the pedal key k3 to be operated. Note that an arrow or the like pointing to the pedal key k3 to be operated may be additionally displayed in place of the marker MK1. In short, in order to designate (or highlight or provide a visual guide for) the pedal key k3 to be operated, it suffices that a particular icon be additionally displayed in relation to the image of the pedal key k3 to be operated. As another example, a display style of the image of the pedal key k3 to be operated may itself be changed in order to designate (or highlight or provide a visual guide for) the pedal key k3. For example, a color of the image of the pedal key k3 to be operated may be changed, or the image of the pedal key k3 to be operated may be displayed in a blinking manner.

Rhythm information representing at least a rhythm (in other words, a sound generation timing and a time length of a sound) of the pedal performance part is displayed on the rhythm information display region 202 per unit section. A length of the unit section can be expressed in the number of measures, for example. The length of the unit section may be variably set by a user or may be a predefined constant length. Here, the rhythm is represented by temporal positions of a plurality of sounds. A temporal position of a sound (hereinafter referred to as "sound position") contains a time range from a start of the sound (namely, a note-on time point) to an end of the sound (namely, a note-off time point). In the illustrated example of FIG. 3, the unit section is a section of one measure, and a rhythm score of one measure including a current position of the music piece is displayed as the rhythm information. The rhythm score represents a rhythm of the pedal performance part by symbols of a note and a rest, while a pitch is not represented in the rhythm score. Namely, the rhythm is visually presented by the sound generation timing and the time length of the sound. Note that the rhythm score may further contain dynamic marks, etc. A marker MK2 indicative of the current position is displayed on the rhythm score. In the illustrated example of FIG. 3, it is indicated by the marker MK2 that the current position is between first and second beats. The marker MK2 is moved as the music piece progresses. Once the current position indicated by the marker MK2 reaches an end of the unit section that is currently displayed, a rhythm score for a next unit section is displayed in turn. The user may select whether the marker MK2 should be displayed or not.

Figure 4:
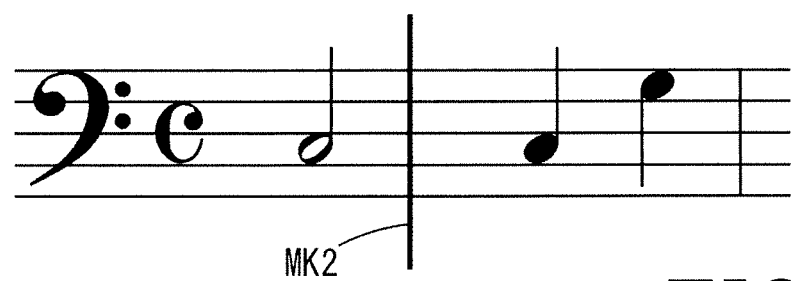
FIG. 4 is a diagram illustrating another example of rhythm information.
Figure 5:
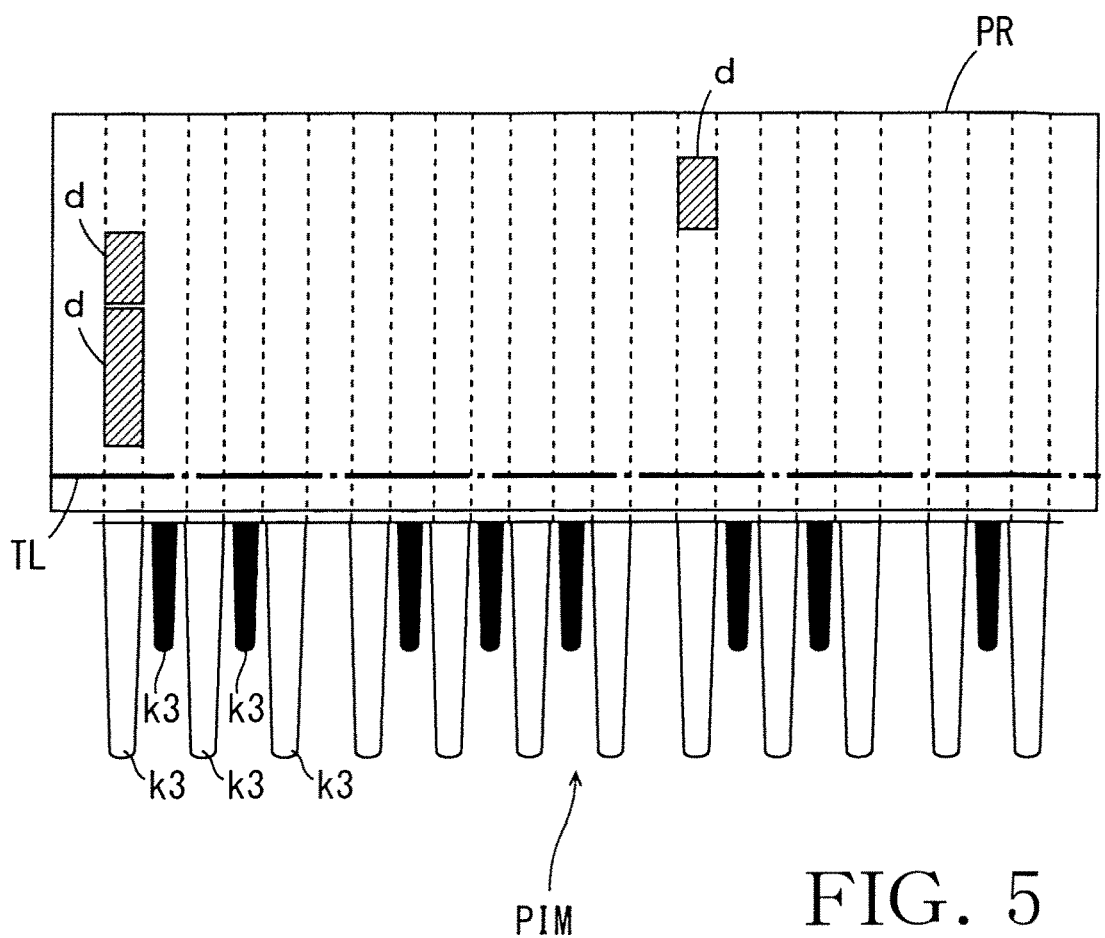
FIG. 5 is a diagram illustrating a further example of rhythm information.

The rhythm information displayed on the rhythm information display region 202 is not limited to the rhythm score. In the present example, the user can select, from a plurality of types of rhythm information, a desired type of rhythm information to be displayed. FIGS. 4 and 5 are diagrams each illustrating another example of rhythm information. In the example of FIG. 4, the rhythm information is a staff notation (bass staff) for one measure including the current position. According to the staff notation, a rhythm and a pitch of the pedal performance part are represented by symbols of a note and a rest. Namely, the rhythm is visually presented by a sound generation timing and a pitch and time length of a sound. Similarly to the example of FIG. 3, the marker MK2 indicative of the current position is displayed on the staff.

In the example of FIG. 5, a rhythm screen PR as the rhythm information is displayed in corresponding relation to the pedal keyboard image PIM. In the rhythm screen PR, a horizontal axis indicates a pitch, and a vertical axis corresponds to a time axis. In the rhythm screen PR, a graphic image d in a rectangular form is displayed in corresponding relation to each sound of the pedal performance part. A position of each graphic image d in a horizontal direction denotes a pitch of a sound corresponding thereto. Specifically, for each graphic image d, a pitch assigned to a pedal key k3 located directly below the graphic image d agrees with a pitch of a sound corresponding to the graphic image d. A length of each graphic image d in a vertical direction denotes a time length of a sound corresponding thereto, and a position of each graphic image d in the vertical direction denotes a time position of the corresponding sound along the time axis. The respective graphic images d move in a lower direction along with the progression of the music piece. Namely, FIG. 5 shows an example that visually presents the rhythm of the sound by an image identifying a sound generation timing and a time length of the sound along a time axis.

A sound generation line TL is displayed near to the bottom of the rhythm screen PR. A distance between the sound generation line TL and each graphic image d corresponds to a time length from the current position to a time point when the corresponding sound is to be performed. Here, a period when a particular graphic image d overlaps with the sound generation line TL corresponds to a period when a sound corresponding to the particular graphic image d is to be performed. Namely, at a time point (note-on time point) when an operation of any pedal key k3 should be started, a lower end of the corresponding graphic image d reaches to the sound generation line TL, and thereafter, at a time point (note-off time point) when the operation of any pedal key k3 should be terminated, an upper end of the corresponding graphic image d reaches to the sound generation line TL.

Generally, a bass part is assigned as the pedal performance part. In the bass part, a same pitch (for example, a pitch of a root note of a chord) is often placed in succession. In such a case, a same key k3 is designated repeatedly on the pedal keyboard image PIM. Thus, start and end timings of the individual notes are difficult to be identified and consequently, it tends to be difficult for the user to identify a timing of an operation of a pedal key k3 and a rhythm thereof if the user is inexperienced. Thus, in the illustrated example, the rhythm information is displayed together with the pedal keyboard image PIM. In such a case, even where a same pitch is repeated in the pedal performance part, the user can easily identify a timing of an operation of a pedal key k3 and a rhythm thereof.

It should be noted that, in a case where the training screen 200 has a sufficient space, in addition to the pedal keyboard image PIM and the rhythm information, a music score indicative of a train of notes to be performed on the manual keyboard HK and/or a chord score and the like may be displayed on the training screen 200.

To summarize the aforementioned, in examples of FIGS. 3, 4 and 5, even though ways of depiction of the time length of note are different from each other, every example visually presents (displays) the rhythm of the sound by an image indicative of a time length of a note (namely, a time value) of the sound corresponding to the visually-designated particular foot operator. Particularly, the example of FIG. 3 presents (displays) the image indicative of the rhythm score for a particular performance section that contains a note of the sound corresponding to the visually-designated particular foot operator. Further, the example of FIG. 5 visually presents (displays) the rhythm of the sound by an image specifying a sound generation timing and a time length of the sound along a time axis. Furthermore, every example of FIGS. 3, 4 and 5 is configured to cause the display 6 (display device) to display an image for presenting the rhythm of the sound corresponding to the visually-designated particular foot operator. Specifically, as shown in FIG. 3 or FIG. 5, the images the pedal keyboard image PIM (foot operator image) and the image for presenting the rhythm of the sound (the image of the rhythm information display region 202 or the rhythm screen PR) are displayed in parallel with each other on the same display screen of the display 6 (display device). In this way, it is achieved such a benefit that the user can recognize clearly at a glance a mutual relation between a particular pedal key k3 (foot operator) to be performed and the rhythm (namely, a performance timing) thereof. More specifically, as shown in FIG. 3, the rhythm of the sound corresponding to the visually-designated particular foot operator is presented (by the marker MK2) in synchronization with the visual designation (by the marker MK1) of the particular foot operator on the pedal keyboard image PIM (foot operator image). In this way, it is achieved such a benefit that the user can more easily recognize clearly at a glance the mutual relation between the particular pedal key k3 (foot operator) to be performed and the rhythm (namely, the performance timing) thereof.

Performance Guide Based on Rhythm Pattern

In the present example, even in a case where part data of the pedal performance part is not included in music piece data of a selected music piece, a guide is provided for assisting the user in performing the pedal performance part on the basis of other part data and rhythm patterns prepared in advance.

Figure 6A:
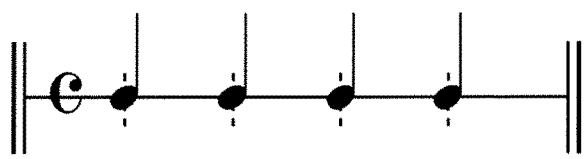
FIGS. 6A to 6C are diagrams illustrating some examples of rhythm patterns.
Figure 6B:
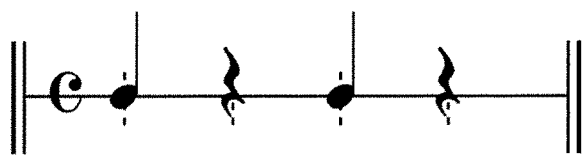
Figure 6C:

FIGS. 6A to 6C shows some examples of the rhythm patterns prepared in advance. In FIGS. 6A to 6C, every beat position is indicated with a dotted line. FIG. 6A shows an example of a basic rhythm pattern in which a unit of the pattern is composed of one measure and a quarter note is arranged at every beat in four-four time. FIG. 6B shows another example of a rhythm pattern in which a unit of the pattern is composed of one measure, a quarter note is arranged at every down beat in four-four time, and a quarter rest is arranged at every up beat in four-four time. FIG. 6C shows further example of a rhythm pattern in which a unit of the pattern is composed of two measures, a dotted quarter note and an eighth note are alternately arranged in the first measure of the unit, and two half-notes are arranged in the second measure of the unit. There may be prepared in advance further different rhythm patterns such as a rhythm pattern in which one whole note is arranged in one measure, a rhythm pattern in which a plurality of eighth notes are successively arranged, a rhythm pattern of time other than four-four time, a rhythm pattern having a unit composed of three or more measures, etc. The rhythm patterns may be stored in the storage device 13 of FIG. 1, for example. The user can select any one of the plurality of rhythm patterns prepared in advance.

Further, a device or circuitry may be provided for detecting a chord from part data of at least one part of the selected music piece and determining a pitch of the pedal performance part on the basis of the detected chord. For example, a root note of the detected chord is determined as the pitch of the pedal performance part. In such a case, if an on chord (fraction chord) is detected, a pitch of a bass note of the on chord (namely, a pitch of a denominator) is determined as the pitch of the pedal performance part. In addition to the root note of the chord or the bass note of the on chord, a pitch of one of other chord constituent notes of the chord (e.g., pitch of fifth) may be determined as the pitch of the pedal performance part.

Figure 7A:
FIGS. 7A and 7B are diagrams illustrating some examples of a train of notes in a pedal performance part.
Figure 7B:

A train of notes in the pedal performance part is defined by the selected rhythm pattern and pitches determined from the chord. FIGS. 7A and 7B diagrams show some examples of a train of notes in the pedal performance part. FIG. 7A shows an example of a train of notes in the pedal performance part when the rhythm pattern shown in FIG. 6A is selected. In FIG. 7A, a chord in a first measure is a C major chord and a chord in a second measure is an E minor chord. In this case, a quarter note having a pitch of a root note "C" of the C major chord is arranged at every beat in the first measure, and a quarter note having a pitch of a root note "E" of the E minor chord is arranged at every beat in the second measure. FIG. 7B shows an example of a train of notes in the pedal performance part when the rhythm pattern shown in FIG. 6B is selected. In FIG. 7B, a chord in a first measure is a C major chord and a chord in a second measure is an E minor chord of an on chord in which a note "B" is designated as the bass note. In this case, a quarter note having a pitch of a root note "C" of the C major chord is arranged at every down beat in the first measure, and a quarter note having a pitch of the bass note "B" of the on chord is arranged at every down beat in the second measure.

In order to cause the user to perform on the pedal keyboard PK according to such a train of notes as shown FIG. 7A or 7B, respective pedal keys k3 to be performed are sequentially designated on the pedal keyboard image PIM, and rhythm information corresponding to the selected rhythm pattern is displayed. In a case where such a type of rhythm information to be presented that includes pitch information (e.g., as shown in FIGS. 4 and 5) is selected, rhythm information including pitch information determined on the basis of a chord is displayed as examples shown in FIGS. 7A and 7B.

The length of the unit section of the rhythm information may be automatically set according to the selected rhythm pattern. For example, in a case where the rhythm pattern like examples shown in FIGS. 6A and 6b in which a unit of the pattern is composed of one measure is selected, the length of the unit section may be set to one measure, and in a case where the rhythm pattern like the example shown in FIG. 6C in which a unit of the pattern is composed of two measures is selected, the length of the unit section may be set to two measures. Note that, even in a case where part data of the pedal performance part is included in music piece data of a selected music piece, in response to a user's request, the guide may be provided for assisting the user in performing the pedal performance part on the basis of the other part data and rhythm patterns prepared in advance as aforementioned.

Functional Configuration

Figure 8:
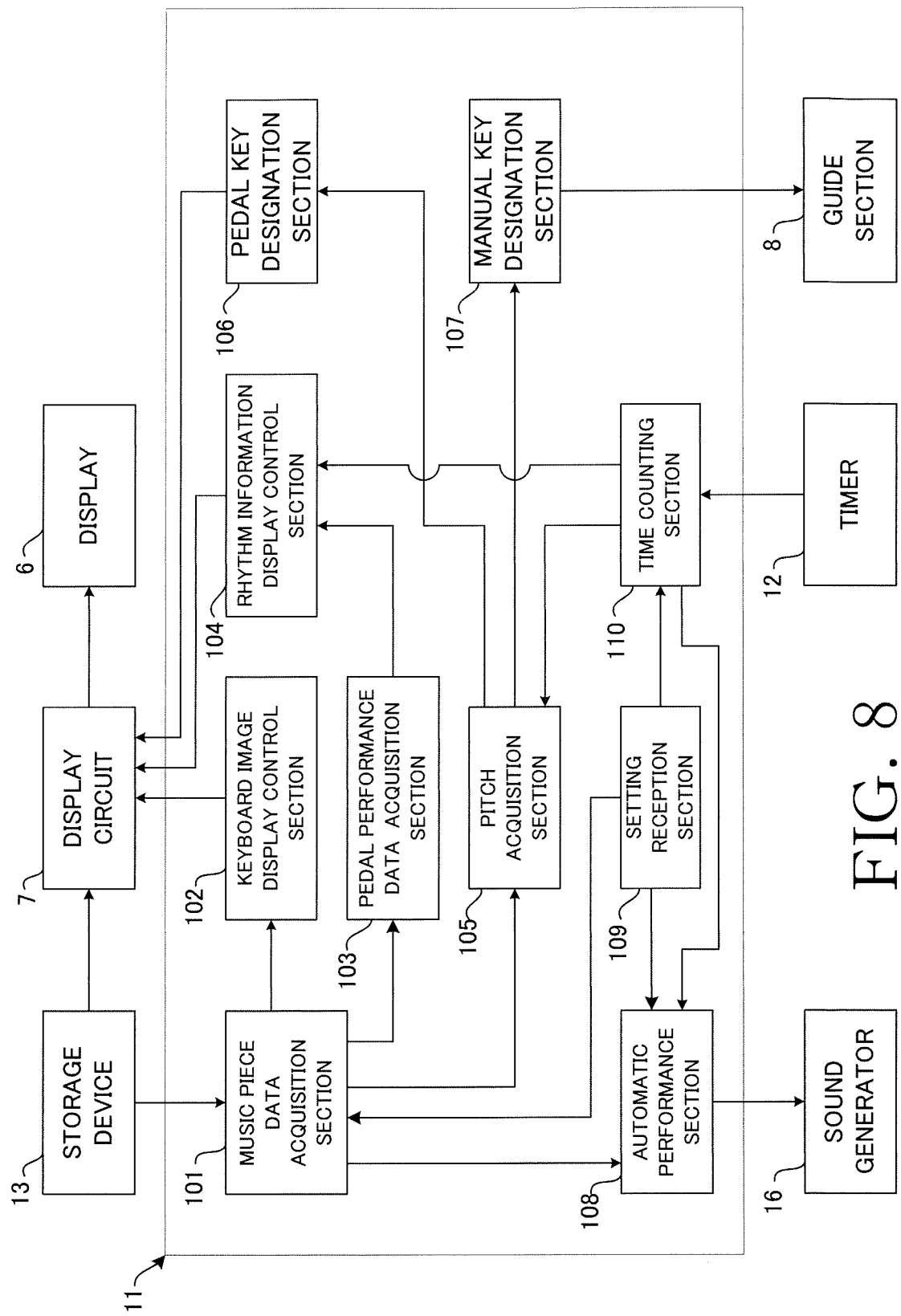
FIG. 8 is a block diagram illustrating a functional configuration of the performance assistance apparatus.

FIG. 8 is a block diagram illustrating a functional configuration of the performance assistance apparatus 100. Functions of various sections of the performance assistance apparatus 100 illustrated in FIG. 8 are performed by the CPU 11 of FIG. 1 executing the performance assistance program stored in the Rom 10 or storage device 13. As illustrated in FIG. 8, the performance assistance apparatus 100 includes a music piece data acquisition section 101, a keyboard image display control section 102, a pedal performance data acquisition section 103, a rhythm information display control section 104, a pitch acquisition section 105, a pedal key designation section 106, a manual key designation section 107, an automatic performance section 108, a setting reception section 109, and a time counting section 110.

The music piece data acquisition section 101 acquires a music piece data set of a music piece selected by the user from among the plurality of music piece data sets stored in the storage device 13. The keyboard image display control section 102 controls the display circuit 7 to display the pedal keyboard image PIM on the display 6.

The pedal performance data acquisition section 103 acquires, as model performance data associated with the pedal performance part, pedal performance data indicative of at least the rhythm of the pedal performance part (namely, information indicative of the rhythm). According to the present example, in a case where part data of the pedal performance part is included in the acquired music piece data, the pedal performance data acquisition section 103 extracts pedal performance data from the part data in the music piece data and automatically reproduces the extracted pedal performance data in accordance with the progression of the music piece (namely, the progression of the automatic performance sequence) to thereby sequentially acquire the pedal performance data indicative of the rhythm (namely, information indicative of the rhythm). On the other hand, in a case where part data of the pedal performance part is not included in the acquired music piece data, the pedal performance data acquisition section 103 may sequentially acquire the pedal performance data indicative of the rhythm (namely, information indicative of the rhythm) on the basis of the selected rhythm pattern. The rhythm information display control section 104 controls, on the basis of the acquired pedal performance data, the display circuit 7 to display rhythm information of the pedal performance part on the display 6 per unit section.

The pitch acquisition section 105 sequentially acquires, from the acquired music piece data, information indicative of respective pitches of the pedal performance part, upper performance part and lower performance part. For example, the pitch acquisition section 105 sequentially acquires, in accordance with the progression of the music piece (the progression of the automatic performance sequence), event data indicative of respective pitches of the respective parts from the respective part data of the pedal performance part, upper performance part and lower performance part. It should be noted that, in a case where part data of the pedal performance part is not included in the acquired music piece data, the pitch acquisition section 105 may be configured to detect a chord from other part data and acquire information indicative of a pitch (namely, event data) of the pedal performance part on the basis of the detected chord. Namely, the pitch acquisition section 105 acquires, at least as model performance data associated with the pedal performance part, event data indicative of the pitch of the pedal performance part.

The pedal key designation section 106 visually designates (specifies), on the pedal keyboard image PIM, a particular one of the pedal keys k3 to be performed on the basis of the acquired information (event data) indicative of the pitch of the pedal performance part. Namely, the marker MK1 is added to the image of the particular pedal key k3, as illustrated for example in FIG. 3. In this manner, the performance assistance unique to the present invention is provided which visually guides, by use of the pedal keyboard image PIM, the user about the particular pedal key k3 to be operated for the music piece performance. The manual key designation section 107 designates the upper key k1 and lower key k2 to be operated on the basis of the acquired information (event data) indicative of respective pitches of the upper performance part and lower performance part. In the illustrated example, the manual key designation section 107 illuminates one of the upper illumination portions L1 corresponding to the upper key k1 to which the pitch of the upper performance part indicated by the acquired information (event data) is assigned, as well as one of the lower illumination portions L2 corresponding to the lower key k2 to which the pitch of the lower performance part indicated by the acquired information (event data) is assigned. In this manner, the conventionally known performance assistance is provided which visually guides the user about the particular manual key to be operated.

Further, the automatic performance section 108 reproduces an automatic performance by outputting to the sound generator 16 the part data of at least one performance part other than the practice performance part from among the acquired part data of the plurality of performance parts of the selected music piece. The performance part reproduced as the automatic performance will hereinafter be referred to as "automatic performance part". Such an automatic performance part may be selected by the user or determined in advance. Alternatively, all of the performance parts other than the practice performance part may be automatically set as the automatic performance parts.

The sequential acquisition of the information indicative of the pitch and rhythm (namely, performance event data) by the pitch acquisition section 105 and pedal performance data acquisition section 103 may be executed under automatic performance sequence control in accordance with a predetermined or user-set performance tempo. At that time, the pitch acquisition section 105 and pedal performance data acquisition section 103 may sequentially acquire the information indicative of the pitch and rhythm (namely, performance event data) at appropriate time points ahead of respective actual sound generation timings as known in the art, because the sequential acquisition of the information indicative of the pitch and rhythm (performance event data) is executed in order to provide a performance-assisting guide display. The music piece data acquisition section 101, pitch acquisition section 105 and pedal performance data acquisition section 103 together function as an acquisition section that acquires model performance data including at least information indicative of a rhythm and a pitch of a foot performance part to be performed by use of the plurality of foot operators. As conventionally known in the art, a performance tempo of the automatic reproduction by the automatic performance section 108 is interlocked with the above-mentioned performance tempo in the pitch acquisition section 105 and pedal performance data acquisition section 103.

The setting reception section 109 receives display settings of the training screen as well as various initial settings. The initial settings include, for example, color (sound color or timbre) designations of the individual performance parts, a designation of an initial tempo, a selection of a practice performance part, and the like. In a case where the training mode has a plurality of sub-modes, the setting reception section 109 may receive a selection of any one of the sub-modes as an initial setting. The sub-modes include a sub-mode in which the music piece does not progress until the user operates a key to be operated, a sub-mode in which the music piece progresses irrespective of a user's performance, and the like. The display settings of the training screen include, for example, a designation of a length of the unit section, a selection of a type of rhythm information to be displayed, a selection as to whether the marker MK2 should be displayed or not, and the like.

The time counting section 110 counts a performance time on the basis of clock signals generated by the timer 12 in accordance with a progression of a music piece. The current position in the music piece is indicated by the time counted by the time counting section 110. Note that when a mode in which the progression of the music piece is stopped in response to a user's performance is currently selected as a sub-mode of the training mode, the time counting section 110 temporarily stops the time counting during the entire time period that the progression of the music piece is stopped.

Training Processing

Figure 9:
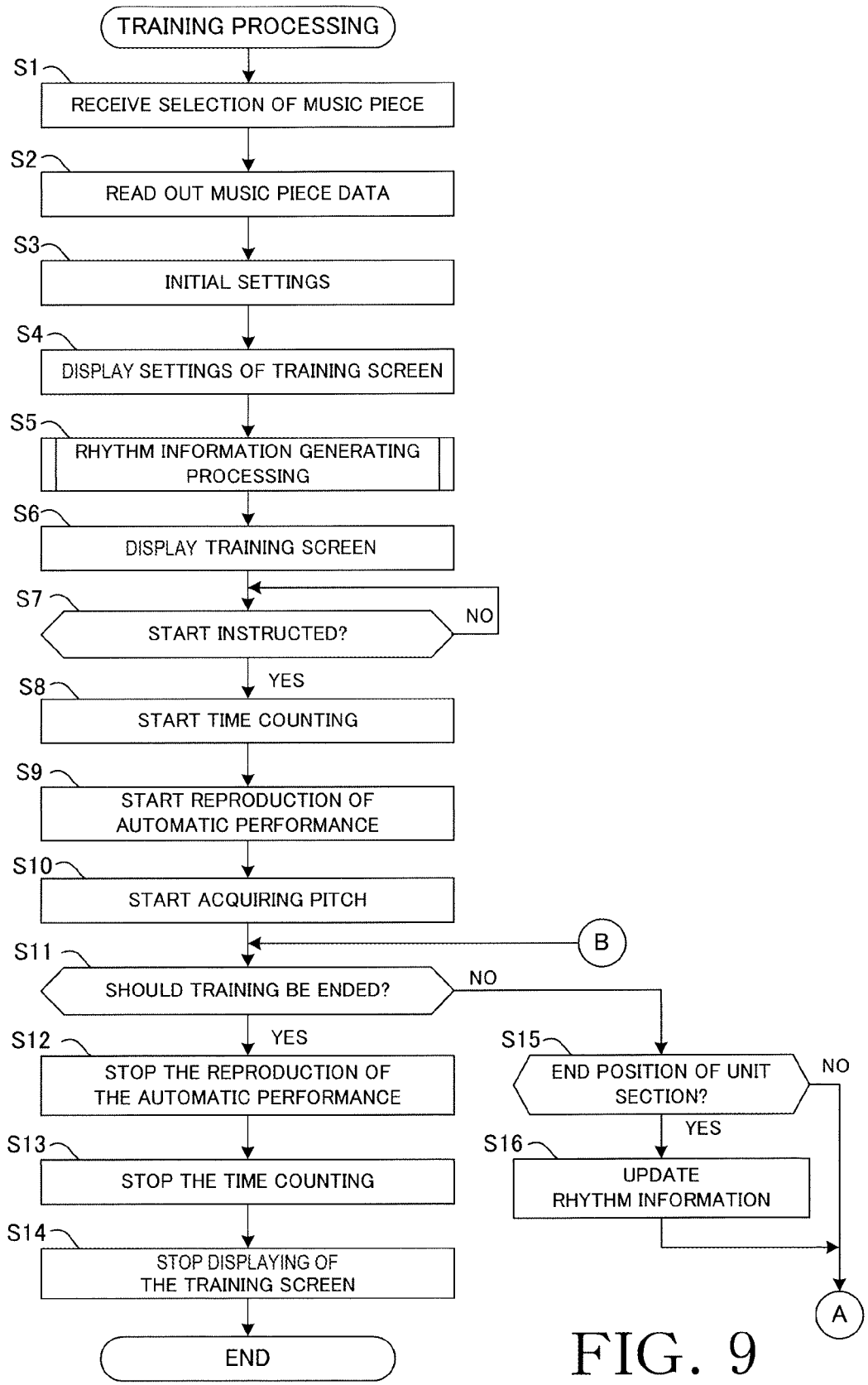
FIG. 9 is a flow chart illustrating an example of a portion of training processing performed in the performance assistance apparatus.
Figure 10:
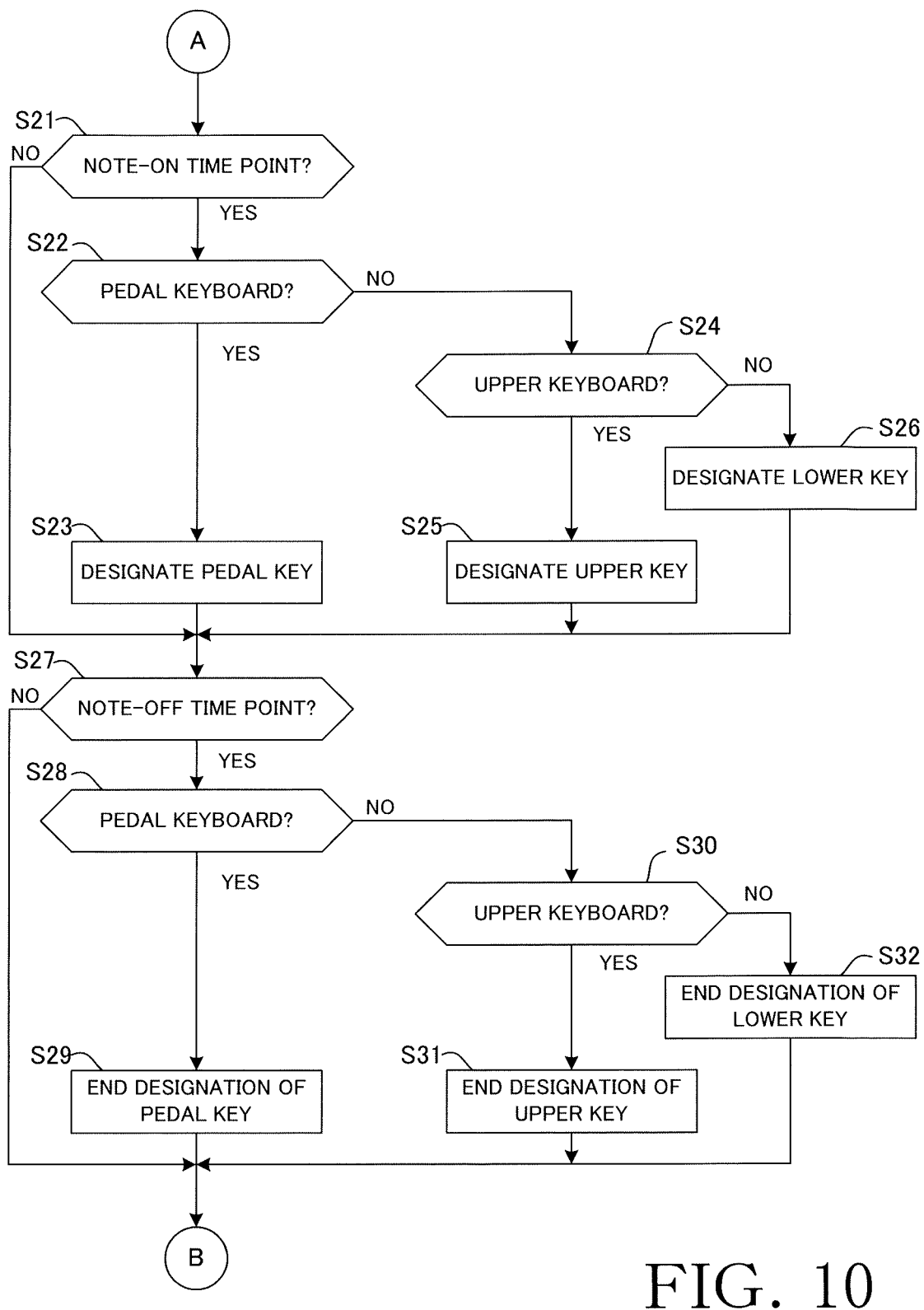
FIG. 10 is a flow chart illustrating an example of the remaining portion of the training processing performed in the performance assistance apparatus.

FIGS. 9 and 10 show together a flow chart illustrating an example of training processing performed by the performance assistance apparatus 100. When the training mode is selected, the training processing of FIGS. 9 and 10 is performed by the CPU 11 of FIG. 1 executing the performance assistance program stored in the ROM 10 or storage device 13.

First, the CPU 11 executes the function of the music piece data acquisition section 101 to receive a selection of a music piece (step S1) and read out the music piece data set of the selected music piece (step S2). For example, once the user selects a music piece by operating the setting operator unit 4 of FIG. 1, the music piece data set of the selected music piece is read out by the function of the music piece data acquisition section 101.

Then, the CPU 11 executes the function of the setting reception section 109 to receive various initial settings (step S3) and receive display settings of the training screen (step S4). Next, the CPU 11 executes the functions of the pedal performance data acquisition section 103 and rhythm information display control section 104 to generate rhythm information by rhythm information generating processing (step S5). Details of the rhythm information generating processing will be set forth later.

Next, the CPU 11 executes the functions of the keyboard image display control section 102 and rhythm information display control section 104 to control the display circuit 7 to display the training screen containing the pedal keyboard image PIM and rhythm information on the display 6 (step S6). At this time point, any pedal key k3 is not yet designated on the pedal keyboard image PIM. Rhythm information of the first unit section of the music piece is displayed on the display 6.

Next, the CPU 11 determines whether or not a start of training has been instructed (step S7). For example, the setting operator unit 4 may include a start button such that a start of training is instructed by the user operating the start button.

Step S7 is repeated until a start of training is instructed. Once a start of training is instructed, the CPU 11 executes the function of the time counting section 110 to start the time counting by the timer 12 of FIG. 1 (step S8). Further, the CPU 11 executes the function of the automatic performance section 108 to start reproduction of an automatic performance on the basis of the part data of the automatic performance part from among the plurality of part data included in the music piece data set read out at step S2 (step S9). Further, the CPU 11 executes the function of the pitch acquisition section 105 to start acquiring pitch data from the part data of each of the practice performance parts (step S10).

Then, the CPU 11 executes the function of the time counting section 110 to determine whether or not the training should be ended (step S11). For example, once the end time point of the selected music piece arrives, it is determined that the training should be ended. Alternatively, the setting operator unit 4 may include a stop button such that it is determined, in response to the user operating the end button, that the training should be ended.

When the training should be ended, the CPU 11 executes the function of the automatic performance section 108 to stop the reproduction of the automatic performance (step S12) and stop the time counting by the time counting section 110 (step S13). Further, the CPU 11 executes the functions of the keyboard image display control section 102 and rhythm information display control section 104 to control the display circuit 7 to stop the display of the training screen on the display 6 (step S14). In this manner, the training processing is ended.

Upon determination at step S11 that the training should not be ended, the CPU 11 executes the function of the rhythm information display control section 104 to determine whether or not the current position in the music piece has arrived at the end position of the unit section of the music piece (step S15). Upon determination at step S15 that the current position in the music piece has arrived at the end position of the unit section, the CPU 11 executes the function of the rhythm information display control section 104 to update the rhythm information, displayed on the training screen, with rhythm information of the next unit section (step S16). If the current position in the music piece has not reached the end position of the unit section as determined at step S15, step S16 is skipped.

Next, the CPU 11 goes to the flow portion of FIG. 10, and executes the function of the pitch acquisition section 105 to sequentially acquire event data (including pitch data) in accordance with performance timings as well known in the field of automatic performance sequence control, and then the CPU 11 determines whether or not a note-on time point of the acquired pitch (namely, note-on event) has arrived (step S21). Namely, if no note-on time point has arrived, steps S22 to S26 to be described below are skipped. Once any note-on time point arrives, the CPU 11 executes the function of the pedal key designation section 106 to determine whether or not the pitch in question is a pitch of the pedal performance part (step S22). If the pitch in question is the pitch of the pedal performance part, the CPU 11 executes the function of the pedal key designation section 106 to visually designate (specify) on the pedal keyboard image PIM a particular one of the keys k3 that corresponds to the pitch in question (step S23). Namely, the marker MK1 is added to the image of the particular key k3, as illustrated for example in FIG. 3.

Upon determination at step S22 that the pitch in question is not a pitch of the pedal performance part, the CPU 11 goes to step S24, where the CPU 11 executes the function of the manual key designation section 107 to further determine whether or not the pitch in question is a pitch of the upper performance part. If the pitch in question is a pitch of the upper performance part, the CPU 11 executes the function of the manual key designation section 107 to designate the upper key k1 corresponding to the pitch in question (step S25). More specifically, the CPU 11 illuminates the upper illumination portion L1 corresponding to the upper key k1 having the pitch in question assigned thereto.

If it is determined at step S24 that the pitch in question is not a pitch of the upper performance part, the CPU 11 executes the function of the manual key designation section 107 to determine that the pitch in question is a pitch of the lower performance part. In such a case, the manual key designation section 107 designates the lower key k1 corresponding to the pitch in question (step S26). More specifically, the CPU 11 illuminates the lower illumination portion L2 corresponding to the lower key k2 having the pitch in question assigned thereto.

Then, the CPU 11 determines whether or not a note-off time point of any acquired pitch (namely, note-off event) has arrived (step S27). Once such a note-off time point arrives as determined at step S27, the CPU 11 executes the function of the pedal key designation section 106 to determine whether or not the pitch in question is a pitch of the pedal performance part (step S28). With a YES determination at step S28, the CPU 11 goes to step S29, where the CPU 11 ends the designation, having so far been made on the pedal keyboard image PIM, of the pedal key corresponding to the pitch in question and then reverts to step S11 of FIG. 9.

Upon determination that the pitch in question corresponding to the note-off event is not a pitch of the pedal performance part, on the other hand, the CPU 11 goes to step S30, where the CPU 11 executes the function of the manual key designation section 107 to determine whether or not the pitch in question is a pitch of the upper performance part. With a YES determination at step S30, the CPU 11 goes to step S31, where the CPU 11 ends the designation of the upper key k1 corresponding to the pitch in question. More specifically, the CPU 11 turns off the upper illumination portion L1 corresponding to the upper key k1 having the pitch in question assigned thereto and then reverts to step S11 of FIG. 9.

Upon determination that the pitch in question corresponding to the note-off event is not a pitch of the upper performance part, namely, if a NO determination is made at step S30, this means that the pitch in question is a pitch of the lower performance part. In such a case, the CPU 11 goes to step S32, where the CPU 11 ends the designation of the lower key k2 corresponding to the pitch in question. More specifically, the CPU 11 turns off the lower illumination portion L2 corresponding to the lower key k2 having the pitch in question assigned thereto and then reverts to step S11 of FIG. 9.

Figure 11:
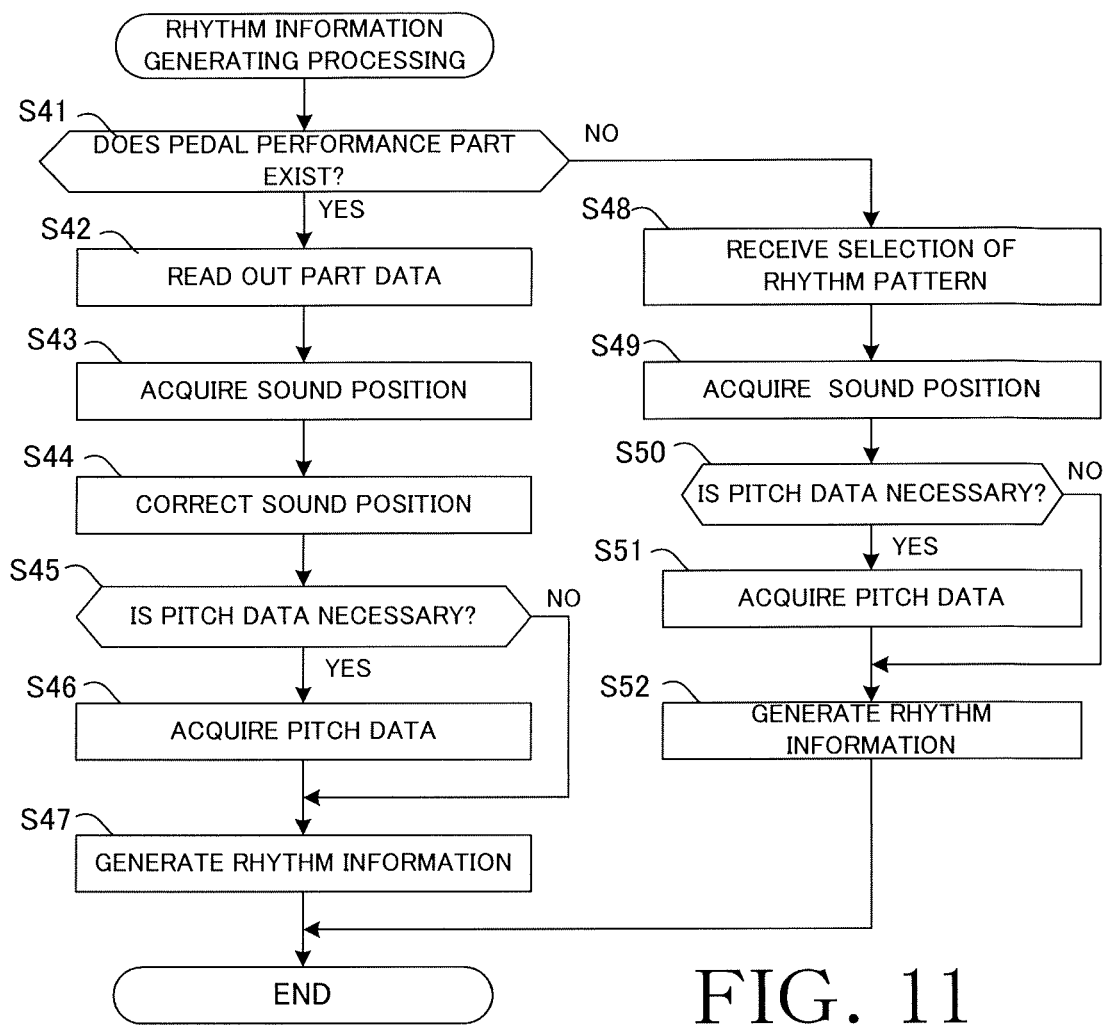
FIG. 11 is a flow chart illustrating an example of rhythm information generating processing.

FIG. 11 shows a flow chart illustrating an example of rhythm information generating processing carried out at step S5 of FIG. 9. The processing of FIG. 11 may be executed in parallel with the processing of the main flow as shown in FIG. 9. At steps S41 to S46 and S48 to S51 of FIG. 11, the CPU 11 executes the function of the pedal performance data acquisition 103. First, at step S41, the CPU 11 determines whether or not a pedal performance part exists in the music piece selected at step S1 of FIG. 9. For example, in a case where a pedal performance part is set in advance in the selected music piece or any part of the selected music piece is selected as a pedal performance part by initial settings at step S3 of FIG. 9, the CPU 11 determines that a pedal performance part exists in the selected music piece. In such a case, the CPU 11 goes to step S42 to read out part data of the pedal performance part from the selected music piece.

Next, the CPU 11 acquires, as the pedal performance data, information indicative of individual sound positions (namely, temporal potion or sound generation timing and length) from the read-out part data (step S43). The individual sound positions are represented by note event data included in the part data, for example. Next, the CPU 11 corrects (quantizes) the acquired sound positions so as to match a predetermined note unit time (step S44). A note value (time value) to be the predetermined note unit time may be based on an eighth note, a sixteenth-note, a kind of triplet, and the like, which may be selected by the user upon the initial settings of step S3 of FIG. 9, for example.

Next, the CPU 11 determines whether or not pitch data of the pedal performance part is necessary for the rhythm information (step S45). For, example, if a type that includes pitch data (e.g., examples of FIGS. 4 and 5) is selected on the display settings of the training screen at step S4 (FIG. 9) as the type of rhythm information to be displayed, the CPU 11 determines that pitch data of the pedal performance part is necessary for the rhythm information. In such a case, the CPU 11 acquires, as the pedal performance data, pitch data corresponding to individual sound positions from the read-out part data (step S46). If no pitch data of the pedal performance part is necessary for the rhythm information, then the CPU 11 skips step S46. Next, the CPU 11 executes the function of the rhythm information display control section 104 to generate the selected type of rhythm information on the basis of the acquired pedal performance data (step S47), and then the CPU 11 ends the rhythm information generating processing. With the processing of step S47, as shown in FIG. 3 or FIG. 5, the image for presenting the rhythm of the sound (the image of the rhythm information display region 202 or the rhythm screen PR) is displayed, and the rhythm of the sound is visually presented (displayed) by the image indicative of the time length of the sound corresponding to the particular pedal key k3 (foot operator) designated visually on the pedal keyboard image PIM (foot operator image), and further, the marker MK2 indicative of the performance progression may be additionally displayed as necessary.

Upon determination at step S41 that no pedal performance part is contained in the selected musical piece, the CPU 11 receives a selection of a rhythm pattern (step S48). For example, rhythm scores of various rhythm patterns such as the examples of FIGS. 6A to 6C are displayed on the display 6 for the user to select a desired rhythm pattern from among the displayed rhythm patterns. The CPU 11 acquires, as the pedal performance data, individual sound positions of the pedal performance part on the basis of the selected rhythm pattern.

Next, similarly to the aforementioned step S45, the CPU 11 determines whether or not pitch data of the pedal performance part is necessary for the rhythm information (step S50). If pitch data of the pedal performance part is necessary, as aforementioned, the CPU 11 detects a chord from the other part data and determines one or more pitches corresponding to the individual sound positions (e.g., time positions of walking bass sounds) of the pedal performance part from the detected chord to acquire the determined pitches as the pedal performance data (step S51). If no pitch data of the pedal performance part is necessary, then the CPU 11 skips step S51. Next, the CPU 11 executes the function of the rhythm information display control section 104 to generate the selected type of rhythm information on the basis of the acquired pedal performance data (step S52), and then the CPU 11 ends the rhythm information generating processing. With the processing of step S52, as shown in FIG. 3 or FIG. 5, the image for presenting the rhythm of the sound (the image of the rhythm information display region 202 or the rhythm screen PR) is displayed, and the rhythm of the sound is visually presented (displayed) by the image indicative of the time length of the sound corresponding to the particular pedal key k3 (foot operator) designated visually on the pedal keyboard image PIM (foot operator image), and further, the marker MK2 indicative of the performance progression may be additionally displayed as necessary.

Advantages of Embodiment

In the present embodiment of the inventive performance assistance apparatus 100, one of the pedal keys k3 to be performed is visually designated on the pedal keyboard image PIM, and the rhythm information indicative of at least the rhythm of the pedal performance part is displayed for each predetermined unit section. Thus, by looking at the pedal keyboard image PIM, the user (or human player) can intuitively know or identify the pedal key k3 to be operated, and the user (or human player) can feel the rhythm accurately. Therefore, the user is enabled to easily master appropriate operations of the pedal keyboard PK. In this way, the present embodiment of the inventive performance assistance apparatus can appropriately assist the human player in performing the pedal keyboard PK and thereby effectively enables the human player to improve his or her skill for performing the pedal keyboard PK.

Further, in the present embodiment of the inventive performance assistance apparatus, the pitches of the upper performance part and lower performance part are sequentially acquired, and the upper keys k1 and lower keys k2 corresponding to the acquired pitches are sequentially designated. Thus, the user can easily know or identify not only the pedal key k3 to be operated but also the upper keys k1 and lower keys k2 to be operated. In this way, the user is enabled to improve his or her skill for performing the manual keyboard HK in addition to the skill for performing the pedal keyboard PK.

Other Embodiments

Although the rhythm information in the above-described embodiment is generated before the start of training having been instructed, the rhythm information may be generated along with the progression of the music piece after the start of training having been instructed. For example, rhythm information for a next unit section may be generated at the end time of each unit section or immediately before thereof, and the generated rhythm information for the next unit section may be displayed upon the end of each unit section.

Although the manual keyboard HK in the above-described embodiment includes two rows of keyboards, the upper keyboard UK and lower keyboard LK, vertically divided from each other, the manual keyboard HK may include only one row of keyboard. In such a case, only one performance part may be selected as a practice performance part of the manual keyboard HK. Alternatively, one row of keyboard may be made dividable into a plurality of key regions. For example, such one row of keyboard may be divided in a left-right direction into a key region for an accompaniment performance and a key region for a melody performance. In such a case, one performance part may be selected for each of the key regions.

In the training mode, in addition to the guide for the manual keyboard HK and pedal keyboard PK, a guide may be provided for assisting the user in performing other operators of the performance operator unit 2 such as the modulation wheel, pitch bend wheel pitch bend wheel, and the like.

An automatic accompaniment may be added to the user's performance. For example, a chord may be identified on the basis of the user's performance on at least one of the lower keyboard LK and pedal keyboard PK, and automatic accompaniment sounds may be output in such a manner as to correspond to the identified chord.

Figure 12:
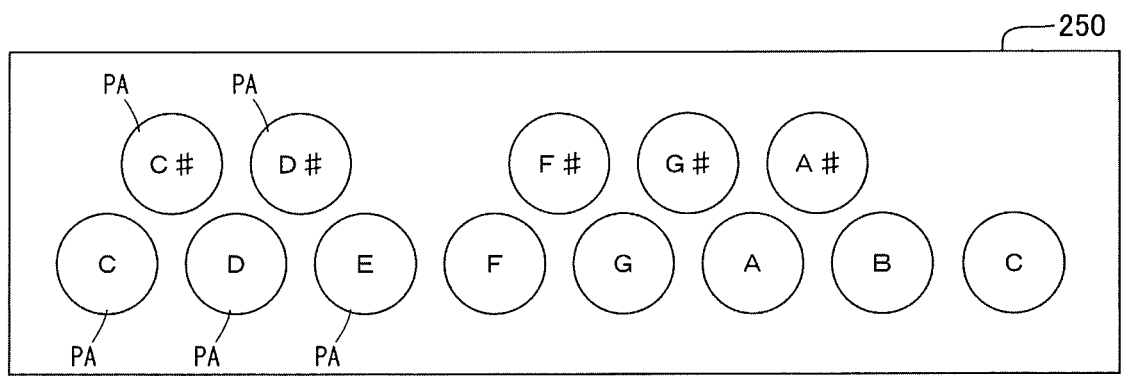
FIG. 12 is a diagram illustrating a performance apparatus including another type of foot operator group.

Although in the above-described embodiments, the pedal keyboard PK is used as an example of the foot operator group to be operated with the user's feet, another type of foot operator group may be used in place of the pedal keyboard PK. FIG. 12 is a diagram illustrating a performance apparatus including such another type of foot operator group. The performance apparatus 250 of FIG. 12 includes, as an example of the foot operator group, a plurality of operating pads PA operable with the user's feet. Different pitches are assigned respectively to the operating pads PA. In FIG. 12, the pitches assigned to the individual operating pads PA are indicated on the operating pads PA. In the case where the performance apparatus 250 of FIG. 12 is employed, a foot operator group image corresponding to the plurality of operating pads PA is displayed on the display. Further, each operating pad PA to be operated is designated on the displayed foot operator group image.

Further, another type of manual operator group, including a plurality of operating pads that are for example similar to the operating pads of FIG. 12, may be used in place of the manual keyboard HK. Furthermore, a plurality of virtual operators displayed on a touch display panel may be used as the foot operator group or manual operator group.

In the above-described embodiments, the individual functional sections of FIG. 8 are implemented by hardware, such as the CPU 11 of FIG. 1, and software, such as the performance assistance program. Namely, in the embodiment illustrated in FIGS. 1, 9 to 11, and the like, a main construction that implements the inventive performance assistance apparatus and/or method is provided by the CPU 11 (namely, processor) executing a necessary application program stored in the RAM 9, ROM 10, or storage device 13 (namely, memory). More specifically, the inventive performance apparatus includes the processor (CPU 11), and the CPU 11 is configured to execute: causing the display device (6) to display the foot operator image (PIM) indicative of the foot operator group (PK) (operation of step S6); acquiring the model performance data including at least information indicative of the rhythm and pitch of the foot performance part to be performed by use of the plurality of foot operators (PK) (operations of steps S10, S21, S43 and S49); on the basis of the information indicative of the pitch of the foot performance part included in the acquired model performance data, visually designating, on the foot operator image (PIM) displayed on the display device (6), a particular foot operator of the plurality of foot operators that corresponds to the pitch (operation of step S23); and on the basis of the information indicative of the rhythm of the foot performance part included in the acquired model performance data, presenting a rhythm of a sound corresponding to the visually-designated particular foot operator (operations of steps S47 and S52). However, the inventive performance assistance apparatus is not so limited, and the individual functional sections illustrated in FIG. 8 may be implemented by a hardware device designed, using electronic circuitry etc., exclusively for the performance assistance purposes.

Although the embodiments of the present invention have been described above in relation to the case where the present invention is applied to the electronic musical instrument 1 including the display 6, the present invention may be applied to an electronic musical instrument connectable (capable of communicating) with an external display device of a smartphone, tablet terminal, or the like. In such a case, the electronic musical instrument 1 is communicatably connected with the external display device of the smartphone, tablet terminal, or the like in a wireless or wired manner via the communication I/F (interface) 14, and the pedal keyboard image and the like are displayed on the external display device by the external display device functioning in a similar manner to the display 6 shown and described in relation to the above-described embodiments.

According to one aspect of the aforementioned embodiment, the performance assistance apparatus includes: a display control section that causes a display device to display a foot operator image indicative of the foot operator group; an acquisition section that acquires model performance data including at least information indicative of a rhythm and a pitch of a foot performance part to be performed by use of the plurality of foot operators; a designation section that, on the basis of the information indicative of the pitch of the foot performance part included in the acquired model performance data, visually designates, on the foot operator image displayed on the display device, a particular foot operator of the plurality of foot operators that corresponds to the pitch; and a rhythm presentation section that, on the basis of the information indicative of the rhythm of the foot performance part included in the acquired model performance data, presents a rhythm of a sound corresponding to the visually-designated particular foot operator.

According to another aspect of the aforementioned embodiment, the rhythm presentation section may display the image as a rhythm score for a particular performance section that contains a note of the sound corresponding to the visually-designated particular foot operator. In such a case, the human player can easily know a rhythm and timing when he/she should perform the foot operator by looking at the rhythm score.

According to further aspect of the aforementioned embodiment, the performance apparatus may further include a manual operator group including a plurality of manual operators that are operable with a hand of the human player and that have different pitches assigned respectively thereto, and the model performance data may further include information indicative of a pitch of a manual performance part to be performed by the manual operator group. The performance assistance apparatus may further include a manual operator designation section that, in accordance with the information indicative of the pitch of the manual performance part included in the model performance data, designates a manual operator of the plurality of manual operators that corresponds to the pitch indicated by the information. In this case, the human player can easily know a manual operator to be operated as well as the foot operator to be operated. Thus, the human player is enabled to simultaneously improve the skill for performing both of the manual operator group and foot operator group.

According to further aspect of the aforementioned embodiment, the manual operator group may be a manual keyboard that includes, as the plurality of manual operators, a plurality of manual keys having a plurality of pitches, constituting a chromatic scale, assigned respectively thereto, and the foot operator group may be a pedal keyboard that includes, as the plurality of foot operators, a plurality of pedal keys having a plurality of pitches, constituting a chromatic scale, assigned respectively thereto. In this case, the performance assistance apparatus effectively enables the human player to improve his or her skill for performing the pedal keyboard in an electronic musical instrument as typified by an electronic organ.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A performance assistance apparatus for application to a performance apparatus provided with a foot operator group including a plurality of foot operators that are operable with a foot of a human player and that have different pitches assigned respectively thereto, the performance assistance apparatus comprising:
   a storage medium storing a program; and
   a processor for executing the program, the processor, when executing the program, configured to:
      cause a display device to display a foot operator image indicative of the foot operator group;
      acquire model performance data including at least information indicative of a rhythm and a pitch of a foot performance part to be performed by use of the plurality of foot operators;
      on the basis of the information indicative of the pitch of the foot performance part included in the acquired model performance data, visually designate, on the foot operator image displayed on the display device, a particular foot operator of the plurality of foot operators that corresponds to the pitch; and
      on the basis of the information indicative of the rhythm of the foot performance part included in the acquired model performance data, present a rhythm of a sound corresponding to the visually-designated particular foot operator.

2. The performance assistance apparatus as claimed in claim 1, wherein the processor is configured to visually present the rhythm of the sound by an image indicative of a time length of the sound corresponding to the visually-designated particular foot operator.

3. The performance assistance apparatus as claimed in claim 2, wherein the image indicative of the time length of the sound is displayed as a rhythm score for a particular performance section that contains a note of the sound corresponding to the visually-designated particular foot operator.

4. The performance assistance apparatus as claimed in claim 1, wherein the processor is configured to visually present the rhythm of the sound by an image specifying a sound generation timing and a time length of the sound along a time axis.

5. The performance assistance apparatus as claimed in claim 1, wherein the processor is configured to cause the display device to display an image for presenting the rhythm of the sound corresponding to the visually-designated particular foot operator.

6. The performance assistance apparatus as claimed in claim 5, wherein the foot operator image and the image for presenting the rhythm of the sound are displayed in parallel with each other on a display screen of the display device.

7. The performance assistance apparatus as claimed in claim 1, wherein the processor is configured to present the rhythm of the sound corresponding to the visually-designated particular foot operator in synchronization with the visual designation of the particular foot operator on the foot operator image.

8. The performance assistance apparatus as claimed in claim 1, wherein the foot operator group provided in the performance apparatus is a pedal keyboard, and the processor is configured to cause the display device to display an image indicative of the pedal keyboard as the foot operator image.

9. The performance assistance apparatus as claimed in claim 1, wherein the performance apparatus further includes a manual operator group including a plurality of manual operators that are operable with a hand of the human player and that have different pitches assigned respectively thereto,
   wherein the model performance data further includes information indicative of a pitch of a manual performance part to be performed by use of the manual operator group, and
   wherein the processor is further configured to, in accordance with the information indicative of the pitch of the manual performance part included in the model performance data, designate a manual operator of the plurality of manual operators that corresponds to the pitch indicated by the information.

10. The performance assistance apparatus as claimed in claim 9, wherein the manual operator group is a manual keyboard that includes, as the plurality of manual operators, a plurality of manual keys having a plurality of pitches, constituting a chromatic scale, assigned respectively thereto, and the foot operator group is a pedal keyboard that includes, as the plurality of foot operators, a plurality of pedal keys having a plurality of pitches, constituting a chromatic scale, assigned respectively thereto.

11. The performance assistance apparatus as claimed in claim 1, which includes the display device provided therein.

12. The performance assistance apparatus as claimed in claim 1, which includes a communication interface such that the performance assistance apparatus is capable of communicating with the display device provided outside the performance assistance apparatus.

13. A computer-implemented performance assistance method for application to a performance apparatus provided with a foot operator group including a plurality of foot operators that are operable with a foot of a human player and that have different pitches assigned respectively thereto, the performance assistance method comprising:

causing a display device to display a foot operator image indicative of the foot operator group;

acquiring model performance data including at least information indicative of a rhythm and a pitch of a foot performance part to be performed by use of the plurality of foot operators;

on the basis of the information indicative of the pitch of the foot performance part included in the acquired model performance data, visually designating, on the foot operator image displayed on the display device, a particular foot operator of the plurality of foot operators that corresponds to the pitch; and on the basis of the information indicative of the rhythm of the foot performance part included in the acquired model performance data, presenting a rhythm of a sound corresponding to the visually-designated particular foot operator.

14. The performance assistance method as claimed in claim 13, wherein the rhythm of the sound corresponding to the visually-designated particular foot operator is visually presented the rhythm of the sound by an image indicative of a time length of the sound corresponding to the visually-designated particular foot operator.

15. The performance assistance method as claimed in claim 14, wherein the image indicative of the time length of the sound is displayed as a rhythm score for a particular performance section that contains a note of the sound corresponding to the visually-designated particular foot operator.

16. The performance assistance method as claimed in claim 13, wherein the rhythm of the sound corresponding to the visually-designated particular foot operator is presented in synchronization with the visual designation of the particular foot operator on the foot operator image.

17. The performance assistance method as claimed in claim 13, wherein the foot operator group provided in the performance apparatus is a pedal keyboard, and the foot operator image is an image indicative of the pedal keyboard.

18. A non-transitory machine-readable storage medium containing a program executable by a processor to perform a performance assistance method for application to a performance apparatus provided with a foot operator group including a plurality of foot operators that are operable with a foot of a human player and that have different pitches assigned respectively thereto, the performance assistance method comprising:

causing a display device to display a foot operator image indicative of the foot operator group;

acquiring model performance data including at least information indicative of a rhythm and a pitch of a foot performance part to be performed by use of the plurality of foot operators;

on the basis of the information indicative of the pitch of the foot performance part included in the acquired model performance data, visually designating, on the foot operator image displayed on the display device, a particular foot operator of the plurality of foot operators that corresponds to the pitch; and on the basis of the information indicative of the rhythm of the foot performance part included in the acquired model performance data, presenting a rhythm of a sound corresponding to the visually-designated particular foot operator.

\* \* \* \* \*